United States Patent
Yue et al.

(10) Patent No.: US 11,632,820 B2
(45) Date of Patent: *Apr. 18, 2023

(54) SECONDARY CELL STATE INDICATION METHOD AND COMMUNICATION DEVICE

(71) Applicant: VIVO MOBILE COMMUNICATION CO., LTD., Chang'an Dongguan (CN)

(72) Inventors: Ran Yue, Chang'an Dongguan (CN); Xiaodong Yang, Chang'an Dongguan (CN); Qian Zheng, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/503,934

(22) Filed: Oct. 18, 2021

(65) Prior Publication Data

US 2022/0039195 A1 Feb. 3, 2022

Related U.S. Application Data

(63) Continuation of application No. 16/959,959, filed as application No. PCT/CN2019/070217 on Jan. 3, 2019, now Pat. No. 11,259,355.

(30) Foreign Application Priority Data

Jan. 4, 2018 (CN) .......................... 201810008827.5

(51) Int. Cl.
*H04W 76/27* (2018.01)

(52) U.S. Cl.
CPC .................................. *H04W 76/27* (2018.02)

(58) Field of Classification Search
CPC . H04W 76/27; H04W 76/15; H04W 52/0206; H04W 72/1226; H04B 10/296; Y02D 30/70

See application file for complete search history.

(56) References Cited

U.S. PATENT DOCUMENTS

| 11,259,355 B2 * | 2/2022 | Yue ....................... H04W 76/27 |
| 2014/0177500 A1 | 6/2014 | Han et al. |
| 2016/0135181 A1 | 5/2016 | Nogami et al. |

(Continued)

FOREIGN PATENT DOCUMENTS

| CN | 102769903 A | 11/2012 |
| CN | 102958045 A | 3/2013 |

(Continued)

OTHER PUBLICATIONS

Chinese Office Action related to Application No. 201810008827.5 dated Apr. 24, 2020.

(Continued)

*Primary Examiner* — Andrew Wendell
(74) *Attorney, Agent, or Firm* — von Briesen & Roper, s.c.

(57) ABSTRACT

An SCell state indication method and a communication device are provided. The SCell state indication method includes: configuring state transition indication information, the state transition indication information being used to indicate an SCell state transition between two of an activated state, a deactivated state and a third state; and transmitting the state transition indication information to a UE.

20 Claims, 4 Drawing Sheets

(56) References Cited

U.S. PATENT DOCUMENTS

2017/0170942 A1 6/2017 Qiu et al.
2017/0238360 A1 8/2017 Chen et al.
2019/0159126 A1 5/2019 Kadiri et al.

FOREIGN PATENT DOCUMENTS

| CN | 104811929 A | 7/2015 |
| CN | 106301721 A | 1/2017 |
| CN | 106304281 A | 1/2017 |

OTHER PUBLICATIONS

International Search Report and Written Opinion related to Application No. PCT/CN2019/070217 dated Jul. 16, 2020.
Non Final Office Action related to U.S. Appl. No. 16/959,959 dated Jul. 28, 2021.
Extended European Search Report related to Application 19736058.9 dated Dec. 20, 2021.
R2-1710138—Source: Qualcomm Incorporated "Fast S Cell activation for enhanced CA utilization", Agenda item: 9.9.2, Document for: Discussion and Decision, 3GPP TSG-RAN2 Meeting #99bis Prague, Czech Republic, Oct. 9-13, 2017.
R2-1712255—Source: Qualcomm Inc, AT&T "Fast S Cell activation for enhanced CA utilization", Agenda item: 9.9.2, Document for: Discussion and Decision, 3GPP TSG-RAN2 Meeting #100 Reno, USA, Nov. 27-Dec. 1, 2017.
R2-1714288—Source to WG: Nokia, et al.—Source to TSG: R2 "Running MAC CR for eu CA", Current Version: 14.4.0, 3GPP TSG-RAN WG2 #100 Reno, USA, Nov. 27-Dec. 1, 2017.
3GPP TS 38.321 V2.0.0 3rd Generation Partnership Project; Technical Specification Group Radio Access Network; NR; Medium Access Control (MAC) protocol specification; (Release 15) V2.0.0 (Dec. 2017).

\* cited by examiner

| A | D | D | D | A | A | A | 0 |

Fig.3

| 1 | 0 | 0 | 0 | 1 | 0 | 0 | 1 |

Fig.4

| N | D | D | D | N | A | A | 1 |

Fig.5

| 0 | 1 | 0 | 1 | 1 | 1 | 1 | 1 |

Fig.6

| 0 | 0 | 1 | 1 | 1 | 1 | 1 | 0 |

Fig.7

| D | D | A | D | N | A | A | 1 |

Fig.8

| | | | | | | | |
|---|---|---|---|---|---|---|---|
| L1 | $C_7$ | $C_6$ | $C_5$ | $C_4$ | $C_3$ | $C_2$ | $C_1$ | R |
| L2 | $C_7$ | $C_6$ | $C_5$ | $C_4$ | $C_3$ | $C_2$ | $C_1$ | R |

Fig.9

| $C_3$ | $C_3$ | $C_2$ | $C_2$ | $C_1$ | $C_1$ | R | R |
| $C_7$ | $C_7$ | $C_6$ | $C_6$ | $C_5$ | $C_5$ | $C_4$ | $C_4$ |

Fig.10

| $C_7$ | $C_6$ | $C_5$ | $C_4$ | $C_3$ | $C_2$ | $C_1$ | R |
| $C_7$ | $C_6$ | $C_5$ | $C_4$ | $C_3$ | $C_2$ | $C_1$ | R |

Fig.11

SECONDARY CELL STATE INDICATION METHOD AND COMMUNICATION DEVICE

CROSS-REFERENCE TO RELATED APPLICATION

The present application is a continuation of U.S. patent application Ser. No. 16/959,959 which is the U.S. national phase of PCT Application No. PCT/CN2019/070217 filed on Jan. 3, 2019, which claims a priority of the Chinese patent application No. 201810008827.5 filed in China on Jan. 4, 2018, all of which are incorporated herein by reference in their entireties.

TECHNICAL FIELD

The present disclosure relates to the field of communication technology, in particular to a Secondary Cell (SCell) state indication method and a communication device.

BACKGROUND

Carrier aggregation technology has been introduced into a Long Term Evolution (LTE) system. In the carrier aggregation technology, one User Equipment (UE) may be in communication with a network via a plurality of serving cells. One of the serving cells is a Primary Cell (PCell), and the others are SCells. Each SCell is in an activated state or a deactivated state, and the PCell is always maintained in an activated state.

Usually, an SCell activation/deactivation mechanism is achieved on the basis of an activation/deactivation Media Access Control (MAC) Control Element (CE) or a deactivation timer. In the SCell activation/deactivation mechanism, there is a relatively large delay for the transition between the activated state and the deactivated state. In order to reduce the delay, a new fast SCell activated state (SCell new state for short) has been introduced into the LTE system. A person skilled in the art understands that, this state may also be called as a third state, a new state or any other known term in the art, i.e., the name of this state shall not be used to limit the state. In one case, the third state may be understood as a state between the activated state and the deactivated state. Briefly, in the third state, Channel Quality Indication (CQI) is allowed to be reported periodically on the basis of a Cell Reference Signal (CRS), and a Physical Downlink Control Channel (PDCCH) is not monitored.

However, there is no scheme for controlling the transition among the three states of the SCell through the MAC CE. In this regard, after the introduction of the third state, such a problem as insufficient compatibility may occur for a communication system.

SUMMARY

In one aspect, the present disclosure provides in some embodiments an SCell state indication method for a network side device, including: configuring state transition indication information, the state transition indication information being used to indicate an SCell state transition between two of an activated state, a deactivated state and a third state; and transmitting the state transition indication information to a User Equipment (UE).

In another aspect, the present disclosure provides in some embodiments an SCell state indication method for a UE, including: receiving a state transition indication information transmitted by a network side device, the state transition indication information being used to indicate an SCell state transition between two of an activated state, a deactivated state and a third state; and transiting the state of the SCell in accordance with the state transition indication information.

In yet another aspect, the present disclosure provides in some embodiments a network side device, including: a configuration module used to configure state transition indication information, the state transition indication information being used to indicate an SCell state transition between two of an activated state, a deactivated state and a third state; and a transmission module used to transmit the state transition indication information to a UE.

In still yet another aspect, the present disclosure provides in some embodiments a UE, including: a reception module used to receive a state transition indication information transmitted by a network side device, the state transition indication information being used to indicate an SCell state transition between two of an activated state, a deactivated state and a third state; and a transition module used to transit the state of SCell in accordance with the state transition indication information.

In still yet another aspect, the present disclosure provides in some embodiments a network side device, including a memory, a processor, and a computer program stored in the memory and executed by the processor. The processor is used to execute the computer program so as to implement the above-mentioned SCell state indication method for the network side device.

In still yet another aspect, the present disclosure provides in some embodiments a UE, including a memory, a processor, and a computer program stored in the memory and executed by the processor. The processor is used to execute the computer program so as to implement the above-mentioned SCell state indication method for the UE.

In still yet another aspect, the present disclosure provides in some embodiments a computer-readable storage medium storing therein a computer program. The computer program is executed by a processor so as to implement the above-mentioned SCell state indication method for the network side device.

In still yet another aspect, the present disclosure provides in some embodiments a computer-readable storage medium storing therein a computer program. The computer program is executed by a processor so as to implement the above-mentioned SCell state indication method for the UE.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

FIG. 3 is a schematic view showing SCell states according to an embodiment of the present disclosure;

FIG. 4 is a schematic view showing a format of an MAC CE according to an embodiment of the present disclosure;

FIG. 5 is another schematic view showing the SCell states according to an embodiment of the present disclosure;

FIGS. 6 and 7 are schematic views showing other formats of the MAC CE according to an embodiment of the present disclosure;

FIG. 8 is yet another schematic view showing the SCell states according to an embodiment of the present disclosure;

FIG. 9 is yet another schematic view showing the format of the MAC CE according to an embodiment of the present disclosure;

FIG. 10 is still yet another schematic view showing the format of the MAC CE according to an embodiment of the present disclosure;

FIG. 11 is still yet another schematic view showing the format of the MAC CE according to an embodiment of the present disclosure;

DETAILED DESCRIPTION

In the following, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
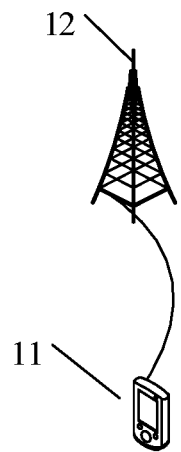
FIG. 1 is a schematic view showing an SCell state indication system according to an embodiment of the present disclosure.

FIG. 1 is a schematic view showing an SCell state indication system according to an embodiment of the present disclosure. As shown in FIG. 1, the SCell state indication system includes a UE 11 and a network side device 12. The UE 11 may be a mobile communication terminal, e.g., mobile phone, tablet personal computer, laptop computer, Personal Digital Assistant (PDA), Mobile Internet Device (MID) or wearable device. It should be appreciated that, a specific type of the UE 11 will not be particularly defined herein. The network side device 12 may be a $5^{th}$-Generation (5G) network side device (e.g., gNB, 5G New Radio (NR) Node B (NB)), a $4^{th}$-Generation (4G) network side device (e.g., evolved Node B (eNB)), or a $3^{rd}$-Generation (3G) network side device (e.g., NB). It should be appreciated that, a specific type of the network side device 12 will not be particularly defined herein.

Figure 2:
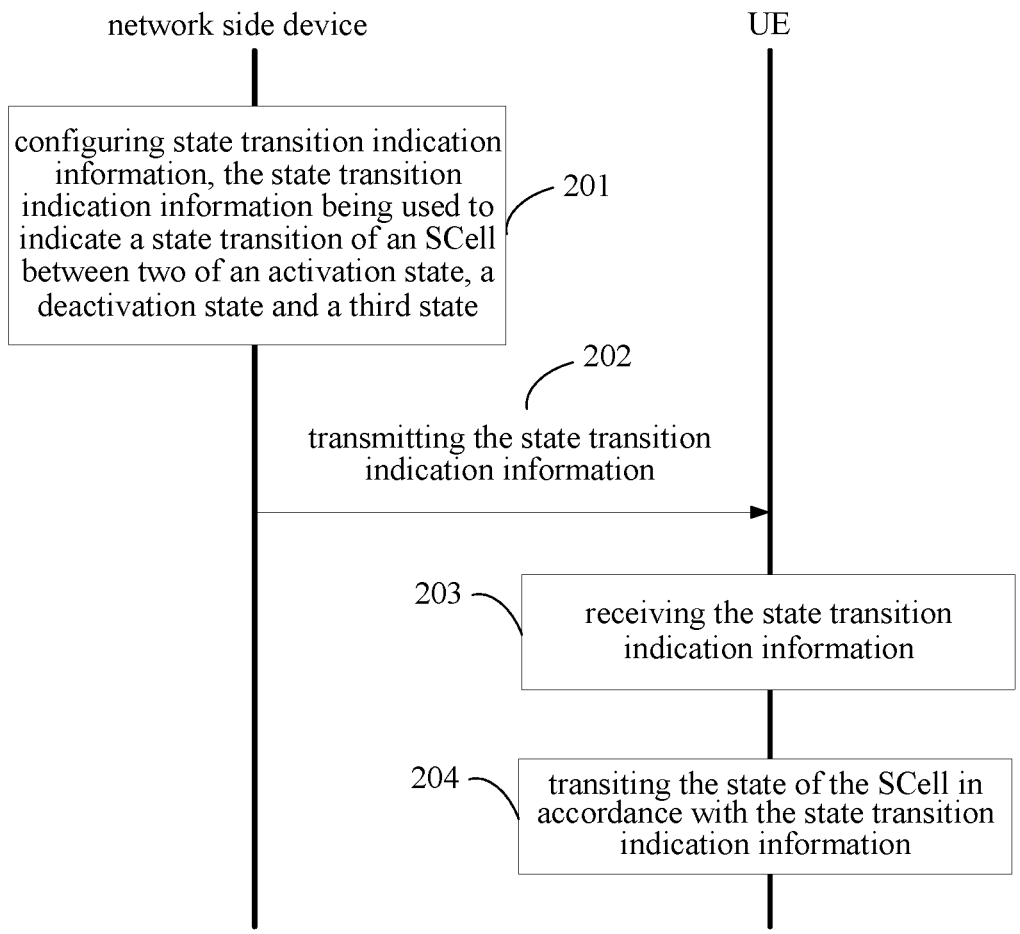
FIG. 2 is a flow chart of an SCell state indication method according to an embodiment of the present disclosure.

As shown in FIG. 2, the present disclosure provides in some embodiments an SCell state indication method, which includes: Step 201 of configuring, by a network side device, state transition indication information, the state transition indication information being used to indicate an SCell state transition between two of an activated state, a deactivated state and a third state; Step 202 of transmitting, by the network side device, the state transition indication information to a UE; Step 203 of receiving, by the UE, the state transition indication information transmitted by the network side device; and Step 204 of transiting, by the UE, the state of the SCell in accordance with the state transition indication information.

According to the embodiments of the present disclosure, the network side device may configure the state transition indication information, and the UE may receive the state transition indication information transmitted by the network side device. In this way, the UE may transit the state of the SCell in accordance with the state transition indication information. The SCell may be transited between two states of the activated state, the deactivated state and the third state.

It should be appreciated that, in the embodiments of the present disclosure, when the SCell is transited between two of the activated state, the deactivated state and the third state, it may be transited between the activated state and the third state in accordance with the state transition indication information, or between the deactivated state and the third state in accordance with the state transition indication information, or between two of the activated state, the deactivated state and the third state in a predetermined transition order in accordance with the state transition indication information.

A specific format of the state transition indication information and a correspondence between transited states may be agreed in a protocol, or configured by a higher layer, which will not be particularly defined herein.

It should be appreciated that, the third state of the SCell may be a SCell new state introduced into an LTE system. There is a relatively large delay when the SCell is transited from the deactivated state to the activated state, so the SCell new state is introduced to reduce the delay. In the LTE system, the new state is defined as new fast SCell activated state, SCell new state for short. In one case, the SCell new state may be a state between the activated state and the deactivated state. In the SCell new state, the following agreements have been made: no L1 signaling is to be introduced in the state transition; CQI is allowed to be reported periodically on the basis of a CRS; a PDCCH is not monitored; and the transition between the SCell new state and the activated state or between the SCell new state and the deactivated state is controlled through an MAC CE.

In addition, in a future communication system, e.g., a 5G NR system, it should be appreciated that, the third state may also be called as New state (N for short), or any other term known to a person skilled in the art, which will not be particularly defined herein.

According to the embodiments of the present disclosure, the state transition indication information may be configured so as to indicate the SCell to be transited between two of the Activated state (A for short), the Deactivated state (D for short) and the third state. Through the introduction of the third state, it is able to reduce the delay generated during the transition of the SCell between the activated state and the deactivated state, thereby to improve the compatibility of the communication system.

For ease of understanding, the SCell state indication method will be described hereinafter in more details in conjunction with various possible forms of the state indication information.

The state transition indication information configured by the network side device may include an MAC CE of N bits, where N is a positive integer. The MAC CE may include M SCell sequence bits $C_i$, where M is a positive integer, and i is an integer smaller than or equal to M, wherein i may be an integer smaller than or equal to M.

In the embodiments of the present disclosure, a value of $C_i$ may be used to indicate the state transition of the SCell corresponding to $C_i$ between two of the activated state, the deactivated state and the third state.

In a possible embodiment of the present disclosure, the MAC CE may further include a reserved bit R. In this regard, a value of R and the value of $C_i$ may be used to indicate the state transition of the SCell corresponding to $C_i$ between two of the activated state, the deactivated state and the third state. When the value of R is a first predetermined value, the state of the SCell corresponding to $C_i$ having a second predetermined value may be indicated to be transited into the third state; when the value of R is a third predetermined value, the state of the SCell corresponding to $C_i$ having a fourth predetermined value may be indicated to be transited from the third state into the activated state or the deactivated state; and when the value of R is a fifth predetermined value, the state of the SCell corresponding to $C_i$ having a sixth predetermined value may be indicated to be transited from a current state into a next state in the predetermined transition order.

First assumption: when the value of the reserved bit R is 1, the corresponding value of $C_i$ is 1 and there is no legacy Logic Channel Identity (LCID) and legacy MAC CE simultaneously, a state of a corresponding SCell may be indicated to be transited into the third state; when the value of the reserved bit R is 1, and the corresponding value of $C_i$ is 0, a state of a corresponding SCell may be indicated to be transited from the third state into the activated state or the deactivated state.

The network side device may configure the legacy MAC CE to indicate whether the state of the corresponding SCell is to be transited from the third state into the activated state or into the deactivated state. The indication of the activated state and the deactivated state through the legacy MAC CE may be implemented in the related art, which will not be particularly defined herein.

The first assumption will be illustratively described hereinafter on the basis of an MAC CE having 8 carriers and 1 byte.

For example, FIG. 3 shows initial states of the SCells, and FIG. 4 shows an MAC CE format, the transited states of the SCells may be shown in FIG. 5 on the basis of the first assumption. When the MAC CE formats are shown in FIGS. 6 and 7 on the basis of the states of the SCells in FIG. 5, the transited states of the SCells may be shown in FIG. 8 on the basis of the first assumption.

Second assumption: when the value of the reserved bit R is 1 and the corresponding value of $C_i$ is 1, a state of a corresponding SCell may be indicated to be transited from a current state into a next state in the predetermined transition order; or when the value of the reserved bit R is 1 and the corresponding value of $C_i$ is 0, a state of a corresponding SCell may be indicated to be transited from the current state into the next state in the predetermined transition order; and the like.

The above schemes may be applied to the MAC CE format having 8 carriers and 1 byte, or an MAC CE format having 32 carriers and 4 bytes, which will not be particularly defined herein.

It should be appreciated that, the present disclosure shall not be limited to the above schemes, and instead, any other feasible schemes may also be applicable.

The state transition indication information configured by the network side device may include an MAC CE and a field L indicating a length of the MAC CE. The MAC CE may include at least two fields, and each field may include N bits, where N is a positive integer. Each field of the MAC CE may include M SCell sequence bits where M is a positive integer, and i is an integer smaller than or equal to M.

In this embodiment, a value of $C_i$ in each field may be used to indicate the state transition of the SCell corresponding to $C_i$ between two of the activated state, the deactivated state and the third state.

In a possible embodiment of the present disclosure, each field of the MAC CE may further include a reserved bit R. In this regard, a value of R and the value of $C_i$ may be used to indicate the state transition of the SCell corresponding to $C_i$ between two of the activated state, the deactivated state and the third state. When the value of R in each field satisfies a first predetermined condition and the value of $C_i$ in each field satisfies a second predetermined condition, the state of the SCell corresponding to $C_i$ may be indicated to be transited into the third state; when the value of R in each field satisfies a third predetermined condition and the value of $C_i$ in each field satisfies a fourth predetermined condition, the state of the SCell corresponding to $C_i$ may be indicated to be transited from the third state into the activated state or the deactivated state; and when the value of R in each field satisfies a fifth predetermined condition and the value of $C_i$ in each field satisfies a sixth predetermined condition, the state of the SCell corresponding to $C_i$ may be indicated to be transited from a current state into a next state in the predetermined transition order.

Correspondingly, the transiting, by the UE, the state of the SCell in accordance with the state transition indication information may include: when the value of R is a first predetermined value, transiting, by the UE, the state of the SCell corresponding to $C_i$ having a second predetermined value into the third state; when the value of R is a third predetermined value, transiting, by the UE, the state of the SCell corresponding to $C_i$ having a fourth predetermined value from the third state into the activated state or the deactivated state; and when the value of R is a fifth predetermined value, transiting, by the UE, the state of the SCell corresponding to $C_i$ having a sixth predetermined value from the current state into a next state in a predetermined transition order.

For example, the MAC CE may include two fields L1 and L2, as shown in FIG. 9.

First assumption: when the values of the reserved bit R in L1 and L2 are each 1, and the values of $C_i$ at a same position in L1 and L2 are the same, a state of a corresponding SCell may be indicated to be transited into the third state, and the states of the other SCells may remain unchanged; or when the values of the reserved bit R in L1 and L2 are each 1, and the values of $C_i$ at a same position in L1 and L2 are different, a state of a corresponding SCell may be indicated to be transited into the third state, and the states of the other SCells may remain unchanged.

When the values of the reserved bit R in L1 and L2 are 1 and 0 respectively, or 0 and 1 respectively, or are each 0, and the values of $C_i$ at a same position in L1 and L2 are the same, a corresponding SCell may be indicated to leave the third state, and the states of the other SCells may remain unchanged; or when the values of the reserved bit R in L1 and L2 are 1 and 0 respectively, or 0 and 1 respectively, or are each 0, and the values of $C_i$ at a same position in L1 and L2 are different, a corresponding SCell may be indicated to leave the third state, and the states of the other SCells may remain unchanged.

The network side device may configure a legacy MAC CE to indicate whether the corresponding SCell is to leave the third state and be transited from the third state into the activated state or into the deactivated state. The indication of the activated state and the deactivated state through the legacy MAC CE may be implemented in the related art, which will not be particularly defined herein.

Second assumption: when the values of the reserved bit R in L1 and L2 are each 1, and the values of $C_i$ at a same position in L1 and L2 are the same, a corresponding SCell may be indicated to be transited from the current state into a next state in the predetermined transition order; or when the values of the reserved bit R in L1 and L2 are each 1, and the values of $C_i$ at a same position in L1 and L2 are different, a corresponding SCell may be indicated to be transited from the current state into the next state in the predetermined transition order.

When the values of the reserved bit R in L1 and L2 are 1 and 0 respectively, or 0 and 1 respectively, or are each 0, and the values of $C_i$ at a same position in L1 and L2 are the same, a corresponding SCell may be indicated to be transited from the current state into the next state in the predetermined transition order; or when the values of the reserved bit R in L1 and L2 are 1 and 0 respectively, or 0 and 1 respectively, or are each 0, and the values of $C_i$ at a same position in L1 and L2 are different, a corresponding SCell may be indicated to be transited from the current state into the next state in the predetermined transition order.

The above schemes may be applied to the MAC CE format having 8 carriers and 1 byte, or an MAC CE format having 32 carriers and 4 bytes, which will not be particularly defined herein.

It should be appreciated that, the present disclosure shall not be limited to the above schemes, and instead, any other feasible schemes may also be applicable.

The state transition indication information configured by the network side device may include an LCID and a first MAC CE of N bits, where N is a positive integer. The first MAC CE may include M SCell sequence bits $C_i$, where M is a positive integer smaller than or equal to N, and i is an integer smaller than or equal to M.

In this embodiment, a value of LCID and the value of $C_i$ may be used to indicate the SCell corresponding to $C_i$ to be transited between two of the activated state, the deactivated state and the third state.

In a possible embodiment of the present disclosure, when the value of LCID is a first predetermined value, the state of the SCell corresponding to $C_i$ having a second predetermined value may be indicated to be transited into the third state; when the value of LCID is a third predetermined value, the state of the SCell corresponding to $C_i$ having a fourth predetermined value may be indicated to leave the third state; and when the value of LCID is a fifth predetermined value, the state of the SCell corresponding to $C_i$ having a sixth predetermined value may be indicated to be transited from a current state into a next state in the predetermined transition order.

The state transition indication information may further include a second MAC CE, and the second MAC CE may be used to indicate the SCell to be transited from the third state into the activated state or the deactivated state.

Correspondingly, the transiting, by the UE, the state of the SCell in accordance with the state transition indication information may include: when the value of LCID is a first predetermined value, transiting the state of the SCell corresponding to $C_i$ having a second predetermined value into the third state; when the value of LCID is a third predetermined value, enabling the state of the SCell corresponding to $C_i$ having a fourth predetermined value to leave the third state; and when the value of LCID is a fifth predetermined value, transiting the state of the SCell corresponding to $C_i$ having a sixth predetermined value from the current state into the next state in the predetermined transition order.

Further, the UE may transit the state of the SCell from the third state into the activated state or the deactivated state in accordance with the second MAC CE.

In the embodiments of the present disclosure, LCID may be shown in Table 1.

TABLE 1

| LCID | Indication |
|---|---|
| xxxxx/xxxxxx | Transiting the SCell into the third state |
| YYYYY/YYYYYY | Enabling the SCell to leave the third state |

First assumption: when the value of LCID is "xxxxx" or "xxxxxx" and the value of $C_i$ in the first MAC CE is 1, the corresponding SCell may be indicated to be transited into the third state, and the states of the other SCells may remain unchanged; or when the value of LCID is "yyyyy" or "yyyyyy" and the value of $C_i$ in the first MAC CE is 1, the corresponding SCell may be indicated to leave the third state, and the states of the other SCells may remain unchanged.

Second assumption: when the value of LCID is "xxxxx" or "xxxxxx" and the value of $C_i$ in the first MAC CE is 0, the corresponding SCell may be indicated to be transited into the third state, and the states of the other SCells may remain unchanged; or when the value of LCID is "yyyyy" or "yyyyyy" and the value of $C_i$ in the first MAC CE is 0, the corresponding SCell may be indicated to leave the third state, and the states of the other SCells may remain unchanged.

Third assumption: when the value of LCID is "xxxxx" or "xxxxxx" and the value of $C_i$ in the first MAC CE is 1, the corresponding SCell may be indicated to be transited into the third state, and the states of the other SCells may remain unchanged; or when the value of LCID is "yyyyy" or "yyyyyy" and the value of $C_i$ in the first MAC CE is 0, the corresponding SCell may be indicated to leave the third state, and the states of the other SCells may remain unchanged.

Fourth assumption: when the value of LCID is "xxxxx" or "xxxxxx" and the value of $C_i$ in the first MAC CE is 0, the corresponding SCell may be indicated to be transited into the third state, and the states of the other SCells may remain unchanged; or when the value of LCID is "yyyyy" or "yyyyyy" and the value of $C_i$ in the first MAC CE is 1, the corresponding SCell may be indicated to leave the third state, and the states of the other SCells may remain unchanged.

In the above assumptions, the network side device may configure a second MAC CE to indicate whether the corresponding SCell is to leave the third state and be transited from the third state into the activated state or into the deactivated state. The indication of the activated state and the deactivated state through the second MAC CE may be implemented in the related art, which will not be particularly defined herein.

Fifth assumption: when the value of LCID is "xxxxx", "xxxxxx", "yyyyy" or "yyyyyy" and the value of $C_i$ in the first MAC CE is 1, the corresponding SCell may be indicated to be transited from a current state into a next state in the predetermined transition order.

Sixth assumption: when the value of LCID is "xxxxx", "xxxxxx", "yyyyy" or "yyyyyy" and the value of $C_i$ in the first MAC CE is 0, the corresponding SCell may be indicated to be transited from the current state into the next state in the predetermined transition order.

The above schemes may be applied to the MAC CE format having 8 carriers and 1 byte, or an MAC CE format having 32 carriers and 4 bytes, which will not be particularly defined herein.

It should be appreciated that, the present disclosure shall not be limited to the above schemes, and instead, any other feasible schemes may also be applicable.

The state transition indication information configured by the network side device may include an LCID and an MAC CE of N bits, where N is a positive integer. The MAC CE may include M SCell sequence bits $C_i$, where M is a positive integer smaller than or equal to N, and i is an integer smaller than or equal to M.

In this embodiment, a value of LCID and the value of $C_i$ may be used to indicate the state transition of the SCell corresponding to $C_i$ between two of the activated state, the deactivated state and the third state.

In a possible embodiment of the present disclosure, when the value of LCID is a first predetermined value, the state of the SCell corresponding to $C_i$ having a second predetermined value may be indicated to be transited from the third state into the activated state; when the value of LCID is a third predetermined value, the state of the SCell corresponding to $C_i$ having a fourth predetermined value may be indicated to be transited from the third state into the deactivated state; and when the value of LCID is a fifth predetermined value, the state of the SCell corresponding to $C_i$ having a sixth predetermined value may be indicated to be transited from the third state into a next state in the predetermined transition order.

Correspondingly, the transiting, by the UE, the state of the SCell in accordance with the state transition indication information may include: when the value of LCID is a first predetermined value, transiting, by the UE, the state of the SCell corresponding to $C_i$ having a second predetermined value from the third state into the activated state; when the value of LCID is a third predetermined value, transiting, by the UE, the state of the SCell corresponding to $C_i$ having a fourth predetermined value from the third state into the deactivated state; and when the value of LCID is a fifth predetermined value, transiting, by the UE, the state of the SCell corresponding to $C_i$ having a sixth predetermined value from the third state into the next state in the predetermined transition order.

In this embodiment, LCID may also be shown in Table 1.

This embodiment differs from the third embodiment in that, when the LCID indicates the SCell is to leave the third state, the MAC CE may be merely valid to the SCell in the third state.

First assumption: when the value of LCID is "yyyyy" or "yyyyyy" and the value of $C_i$ in the MAC CE in the third state is 1, the corresponding SCell may be indicated to be transited from the third state into the activated state; when the value of LCID is "yyyyy" or "yyyyyy" and the value of $C_i$ in the MAC CE in the third state is 0, the corresponding SCell may be indicated to be transited from the third state into the deactivated state, and $C_i$ corresponding to the SCells not in the third state may be omitted.

Second assumption: when the value of LCID is "xxxxx", "xxxxxx", "yyyyy" or "yyyyyy" and the value of $C_i$ in the MAC CE is 1, the corresponding SCell may be indicated to be transited from a current state into a next state in the predetermined transition order.

Third assumption: when the value of LCID is "xxxxx", "xxxxxx", "yyyyy" or "yyyyyy" and the value of $C_i$ in the MAC CE is 0, the corresponding SCell may be indicated to be transited from the current state into the next state in the predetermined transition order.

The above schemes may be applied to the MAC CE format having 8 carriers and 1 byte, or an MAC CE format having 32 carriers and 4 bytes, which will not be particularly defined herein.

It should be appreciated that, the present disclosure shall not be limited to the above schemes, and instead, any other feasible schemes may also be applicable.

The state transition indication information configured by the network side device may include an LCID and an MAC CE of N bits, where N is a positive integer. The MAC CE may include M groups of SCell sequence bits $C_i$, and each group of $C_i$ may include X bits, where M is a positive integer, X is a positive integer greater than 1, and i is an integer smaller than or equal to M.

In this embodiment, a value of LCID and values of the X bits in each group of $C_i$ may be used to indicate the state of the SCell corresponding to $C_i$ to be transited into one of the activated state, the deactivated state and the third state.

Correspondingly, the transiting, by the UE, the state of the SCell in accordance with the state transition indication information may include: when the values of the X bits in $C_i$ are used to indicate the state of the SCell corresponding to $C_i$ to be transited into the third state, transiting, by the UE, the state of the SCell corresponding to $C_i$ into the third state; when the values of the X bits in $C_i$ are used to indicate the state of the SCell corresponding to $C_i$ to be transited into the activated state, transiting, by the UE, the state of the SCell corresponding to $C_i$ into the activated state; and when the values of the X bits in $C_i$ are used to indicate the state of the SCell corresponding to $C_i$ to be transited into the deactivated state, transiting, by the UE, the state of the SCell corresponding to $C_i$ into the deactivated state.

In this embodiment, a new LCID (e.g., that in Table 2) may be defined to indicate a corresponding MAC CE (e.g., that in FIG. 10 or 11), so as to control the state of the SCell.

TABLE 2

| LCID | Indication |
|---|---|
| zzzzz/zzzzzz | Activated state, deactivated state or third state |

First assumption is shown in Table 3.

TABLE 3

| $C_i C_i$ | State |
|---|---|
| 00 | Deactivated state |
| 01 | Third state |
| 10 | Reserved |
| 11 | Activated state |

Second assumption is shown in Table 4.

TABLE 4

| $C_i C_i$ | State |
|---|---|
| 00 | Deactivated state |
| 01 | Reserved |

TABLE 4-continued

| $C_i C_i$ | State |
| --- | --- |
| 10 | Third state |
| 11 | Activated state |

The above schemes may be applied to the MAC CE format having 8 carriers and 1 byte, or an MAC CE format having 32 carriers and 4 bytes, which will not be particularly defined herein.

It should be appreciated that, the present disclosure shall not be limited to the above schemes, and instead, any other feasible schemes may also be applicable.

The state transition indication information configured by the network side device may include an MAC CE and a field L indicating a length of the MAC CE. The MAC CE may include a first indication bit string indicating a sequence of SCells and a second indication bit string indicating the state of the SCell, where M is a positive integer, and i is an integer smaller than or equal to M. The first indication bit string may include at least three bits, and the second indication bit string may include at least two bits.

In this embodiment, a value of the first indication bit string and a value of the second indication bit string may be used to indicate the state of the SCell corresponding to the first indication bit string to be transited into one of the activated state, the deactivated state and the third state.

Correspondingly, the transiting, by the UE, the state of the SCell in accordance with the state transition indication information may include: when the value of the second indication bit string is used to indicate a state of an SCell to be transited into the third state, transiting the state of the SCell corresponding to the value of the first indication bit string into the third state; when the value of the second indication bit string is used to indicate a state of an SCell to be transited into the activated state, transiting the state of the SCell corresponding to the value of the first indication bit string into the activated state; and when the value of the second indication bit string is used to indicate a state of an SCell to be transited into the deactivated state, transiting the state of the SCell corresponding to the value of the first indication bit string into the deactivated state.

In this embodiment, a new LCID (e.g., that in Table 2) may be defined to indicate a corresponding MAC CE, so as to control the state of one or more SCells. The length of the MAC CE may be indicated by the field L.

Figure 12:
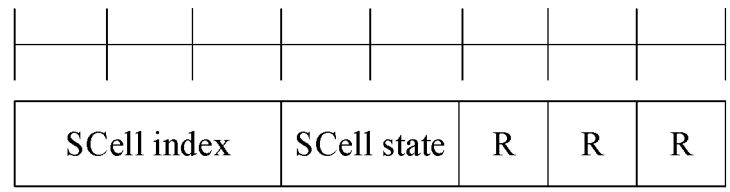
FIG. 12 is still yet another schematic view showing the format of the MAC CE according to an embodiment of the present disclosure.

FIG. 12 shows the MAC CE format. In FIG. 12, "SCell index" is used to represent the first indication bit string indicating the SCell sequence, and "SCell state" is used to represent the second indication bit string indicating the state of the SCell. In the above MAC CE formats, positions of the bit R are merely for illustrative purposes. In a possible embodiment of the present disclosure, "SCell index" may occupy three bits, and "SCell state" may occupy two bits.

The above schemes may be applied to the MAC CE format having 8 carriers and 1 byte, or an MAC CE format having 32 carriers and 4 bytes, which will not be particularly defined herein.

It should be appreciated that, the present disclosure shall not be limited to the above schemes, and instead, any other feasible schemes may also be applicable.

In a word, according to the embodiments of the present disclosure, the state transition indication information may be configured so as to indicate the SCell state transition between two of the activated state, the deactivated state and the third state, so as to solve the problems in the related art.

Figure 13:
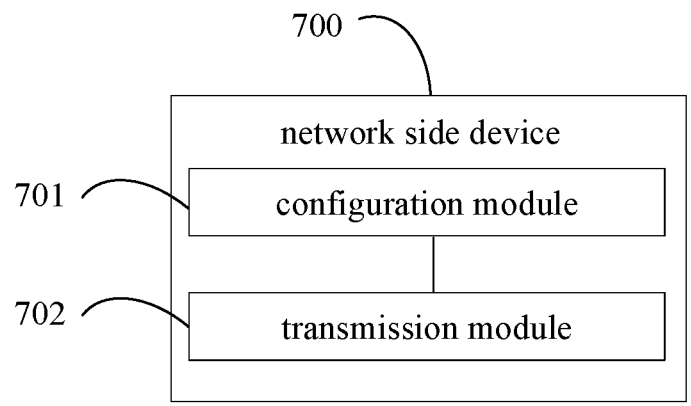
FIG. 13 is a schematic view showing a network side device according to an embodiment of the present disclosure.

The present disclosure further provides in some embodiments a network side device 700 which, as shown in FIG. 13, includes: a configuration module 701 used to configure state transition indication information, the state transition indication information being used to indicate an SCell state transition between two of an activated state, a deactivated state and a third state; and a transmission module 702 used to transmit the state transition indication information to a UE.

In a possible embodiment of the present disclosure, the state transition indication information may include an MAC CE of N bits, where N is a positive integer. The MAC CE may include M SCell sequence bits $C_i$, where M is a positive integer, and i is an integer smaller than or equal to M. A value of $C_i$ may be used to indicate the transition state of the SCell corresponding to $C_i$ between two of the activated state, the deactivated state and the third state.

In a possible embodiment of the present disclosure, the MAC CE may further include a reserved bit R. When a value of R is a first predetermined value, the state of the SCell corresponding to $C_i$ having a second predetermined value may be indicated to be transited into the third state; when the value of R is a third predetermined value, the state of the SCell corresponding to $C_i$ having a fourth predetermined value may be indicated to be transited from the third state into the activated state or the deactivated state; and when the value of R is a fifth predetermined value, the state of the SCell corresponding to $C_i$ having a sixth predetermined value may be indicated to be transited from a current state into a next state in a predetermined transition order.

In a possible embodiment of the present disclosure, the state transition indication information may include an MAC CE and a field L indicating a length of the MAC CE. The MAC CE may include at least two fields, and each field may include N bits, where N is a positive integer. Each field of the MAC CE may include M SCell sequence bits $C_i$, where M is a positive integer, and i is an integer smaller than or equal to M. A value of $C_i$ in each field may be used to indicate the transition state of the SCell corresponding to $C_i$ between two of the activated state, the deactivated state and the third state.

In a possible embodiment of the present disclosure, each field in the MAC CE may further include a reserved bit R. When a value of R in each field satisfies a first predetermined condition and the value of $C_i$ in each field satisfies a second predetermined condition, the state of the SCell corresponding to $C_i$ may be indicated to be transited into the third state; when the value of R in each field satisfies a third predetermined condition and the value of $C_i$ in each field satisfies a fourth predetermined condition, the state of the SCell corresponding to $C_i$ may be indicated to be transited from the third state into the activated state or the deactivated state; and when the value of R in each field satisfies a fifth predetermined condition and the value of $C_i$ in each field satisfies a sixth predetermined condition, the state of the SCell corresponding to $C_i$ may be indicated to be transited from a current state into a next state in the predetermined transition order.

In a possible embodiment of the present disclosure, the state transition indication information may include an LCID and a first MAC CE of N bits, where N is a positive integer. The first MAC CE may include M SCell sequence bits $C_i$, where M is a positive integer smaller than or equal to N, and i is an integer smaller than or equal to M. A value of LCID and a value of $C_i$ may be used to indicate the state transition of the SCell corresponding to $C_i$ between two of the activated state, the deactivated state and the third state.

In a possible embodiment of the present disclosure, when the value of LCID is a first predetermined value, the state of the SCell corresponding to $C_i$ having a second predetermined value may be indicated to be transited into the third state; when the value of LCID is a third predetermined value, the state of the SCell corresponding to $C_i$ having a fourth predetermined value may be indicated to leave the third state; and when the value of LCID is a fifth predetermined value, the state of the SCell corresponding to $C_i$ having a sixth predetermined value may be indicated to be transited from a current state into a next state in the predetermined transition order.

In a possible embodiment of the present disclosure, the state transition indication information may further include a second MAC CE, and the second MAC CE may be used to indicate the SCell state transition from the third state into the activated state or the deactivated state.

In a possible embodiment of the present disclosure, the state transition indication information may include an LCID and an MAC CE of N bits, where N is a positive integer. The MAC CE may include M SCell sequence bits $C_i$, where M is a positive integer smaller than or equal to N, and i is an integer smaller than or equal to M. A value of LCID and a value of $C_i$ may be used to indicate the state transition of the SCell corresponding to $C_i$ between two of the activated state, the deactivated state and the third state.

In a possible embodiment of the present disclosure, when the value of LCID is a first predetermined value, the state of the SCell corresponding to $C_i$ having a second predetermined value may be indicated to be transited from the third state into the activated state; when the value of LCID is a third predetermined value, the state of the SCell corresponding to $C_i$ having a fourth predetermined value may be indicated to be transited from the third state into the deactivated state; and when the value of LCID is a fifth predetermined value, the state of the SCell corresponding to $C_i$ having a sixth predetermined value may be indicated to be transited from the third state into a next state in the predetermined transition order.

In a possible embodiment of the present disclosure, the state transition indication information may include an LCID and an MAC CE of N bits, where N is a positive integer. The MAC CE may include M groups of SCell sequence bits $C_i$, and each group of $C_i$ may include X bits, where M is a positive integer, X is a positive integer greater than 1, and i is an integer smaller than or equal to M. A value of LCID and values of the X bits in each group of $C_i$ may be used to indicate the state of the SCell corresponding to $C_i$ to be transited into any one of the activated state, the deactivated state and the third state.

In a possible embodiment of the present disclosure, the state transition indication information may include an MAC CE and a field L indicating a length of the MAC CE. The MAC CE may include a first indication bit string indicating a sequence of SCells and a second indication bit string indicating the state of the SCell, where M is a positive integer, and i is an integer smaller than or equal to M. The first indication bit string may include at least three bits, and the second indication bit string may include at least two bits. A value of the first indication bit string and a value of the second indication bit string may be used to indicate the state of the SCell corresponding to the first indication bit string to be transited into one of the activated state, the deactivated state and the third state.

It should be appreciated that, the network side device 700 in the embodiments of the present disclosure is capable of implementing the above-mentioned SCell state indication method for the network side device with a same beneficial effect, which will not be particularly defined herein.

Figure 14:
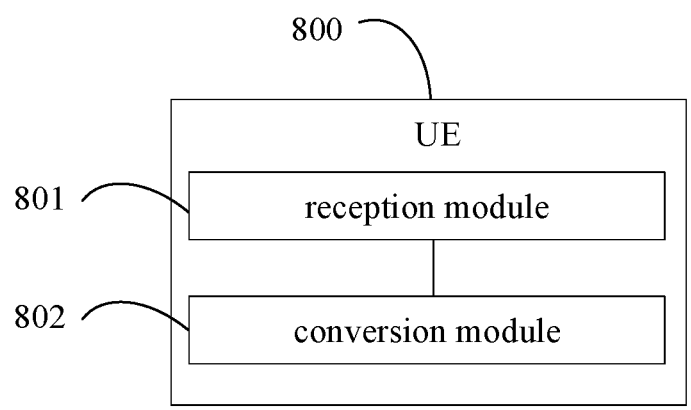
FIG. 14 is a schematic view showing a UE according to an embodiment of the present disclosure.

The present disclosure further provides in some embodiments a UE 800 which, as shown in FIG. 14, includes: a reception module 801 used to receive a state transition indication information from a network side device, the state transition indication information being used to indicate an SCell state transition between two of an activated state, a deactivated state and a third state; and a transition module 802 used to transit the state of SCell in accordance with the state transition indication information.

In a possible embodiment of the present disclosure, the state transition indication information may include an MAC CE of N bits, where N is a positive integer. The MAC CE may include M SCell sequence bits $C_i$, where M is a positive integer, and i is an integer smaller than or equal to M. A value of $C_i$ may be used to indicate the state transition of the SCell corresponding to $C_i$ between two of the activated state, the deactivated state and the third state.

In a possible embodiment of the present disclosure, the MAC CE may further include a reserved bit R. The transition module 802 is further used to: when a value of R is a first predetermined value, transit the state of the SCell corresponding to $C_i$ having a second predetermined value into the third state; when the value of R is a third predetermined value, transit the state of the SCell corresponding to $C_i$ having a fourth predetermined value from the third state into the activated state or the deactivated state; and when the value of R is a fifth predetermined value, transit the state of the SCell corresponding to $C_i$ having a sixth predetermined value from a current state into a next state in a predetermined transition order.

In a possible embodiment of the present disclosure, the state transition indication information may include an MAC CE and a field L indicating a length of the MAC CE. The MAC CE may include at least two fields, and each field may include N bits, where N is a positive integer. Each field of the MAC CE may include M SCell sequence bits $C_i$, where M is a positive integer, and i is an integer smaller than or equal to M. A value of $C_i$ in each field may be used to indicate the state transition of the SCell corresponding to $C_i$ between two of the activated state, the deactivated state and the third state.

In a possible embodiment of the present disclosure, each field in the MAC CE may further include a reserved bit R. The transition module 802 is further used to: when a value of R in each field satisfies a first predetermined condition and the value of $C_i$ in each field satisfies a second predetermined condition, transit the state of the SCell corresponding to $C_i$ into the third state; when the value of R in each field satisfies a third predetermined condition and the value of $C_i$ in each field satisfies a fourth predetermined condition, transit the state of the SCell corresponding to $C_i$ from the third state into the activated state or the deactivated state; and when the value of R in each field satisfies a fifth predetermined condition and the value of $C_i$ in each field satisfies a sixth predetermined condition, transit the state of the SCell corresponding to $C_i$ from a current state into a next state in the predetermined transition order.

In a possible embodiment of the present disclosure, the state transition indication information may include an LCID and a first MAC CE of N bits, where N is a positive integer. The first MAC CE may include M SCell sequence bits $C_i$, where M is a positive integer, and i is an integer smaller than or equal to M. A value of LCID and a value of $C_i$ may be used to indicate the state transition of the SCell corresponding to $C_i$ between two of the activated state, the deactivated state and the third state.

In a possible embodiment of the present disclosure, the transition module 802 is further used to: when the value of the LCID is a first predetermined value, transit the state of the SCell corresponding to $C_i$ having a second predetermined value into the third state; when the value of LCID is a third predetermined value, enable the state of the SCell corresponding to $C_i$ having a fourth predetermined value to leave the third state; and when the value of LCID is a fifth predetermined value, transit the state of the SCell corresponding to $C_i$ having a sixth predetermined value from a current state into a next state in the predetermined transition order.

In a possible embodiment of the present disclosure, the state transition indication information may further include a second MAC CE, and the second MAC CE may be used to indicate the SCell state transition from the third state into the activated state or the deactivated state.

In a possible embodiment of the present disclosure, the state transition indication information may include an LCID and an MAC CE of N bits, where N is a positive integer. The MAC CE may include M SCell sequence bits $C_i$, where M is a positive integer smaller than or equal to N, and i is an integer smaller than or equal to M. A value of the LCID and a value of $C_i$ may be used to indicate the state transition of the SCell corresponding to $C_i$ between two of the activated state, the deactivated state and the third state.

In a possible embodiment of the present disclosure, the transition module 802 is further used to: when the value of LCID is a first predetermined value, transit the state of the SCell corresponding to $C_i$ having a second predetermined value from the third state into the activated state; when the value of LCID is a third predetermined value, transit the state of the SCell corresponding to $C_i$ having a fourth predetermined value from the third state into the deactivated state; and when the value of LCID is a fifth predetermined value, transit the state of the SCell corresponding to $C_i$ having a sixth predetermined value from the third state into a next state in the predetermined transition order.

In a possible embodiment of the present disclosure, the state transition indication information may include an LCID and an MAC CE of N bits, where N is a positive integer. The MAC CE may include M groups of SCell sequence bits $C_i$ and each group of $C_i$ may include X bits, where M is a positive integer, X is a positive integer greater than 1, and i is an integer smaller than or equal to M. A value of LCID and a value of the X bits in each group of $C_i$ may be used to indicate the state of the SCell corresponding to $C_i$ to be transited into one of the activated state, the deactivated state and the third state.

In a possible embodiment of the present disclosure, the transition module 802 is further used to: when the value of the X bits in $C_i$ is used to indicate the state of the SCell corresponding to $C_i$ to be transited into the third state, transit the state of the SCell corresponding to $C_i$ into the third state; when the value of the X bits in $C_i$ is used to indicate the state of the SCell corresponding to $C_i$ to be transited into the activated state, transit the state of the SCell corresponding to $C_i$ into the activated state; and when the value of the X bits in $C_i$ is used to indicate the state of the SCell corresponding to $C_i$ to be transited into the deactivated state, transit the state of the SCell corresponding to $C_i$ into the deactivated state.

In a possible embodiment of the present disclosure, the state transition indication information may include an MAC CE and a field L indicating a length of the MAC CE. The MAC CE may include a first indication bit string indicating a sequence of SCells and a second indication bit string indicating the state of the SCell, where M is a positive integer, and i is an integer smaller than or equal to M. The first indication bit string may include at least three bits, and the second indication bit string may include at least two bits. A value of the first indication bit string and a value of the second indication bit string may be used to indicate the state of the SCell corresponding to the first indication bit string to be transited into one of the activated state, the deactivated state and the third state.

In a possible embodiment of the present disclosure, the transition module 802 is further used to: when the value of the second indication bit string is used to indicate a state of an SCell to be transited into the third state, transit the state of the SCell corresponding to the value of the first indication bit string into the third state; when the value of the second indication bit string is used to indicate a state of an SCell to be transited into the activated state, transit the state of the SCell corresponding to the value of the first indication bit string into the activated state; and when the value of the second indication bit string is used to indicate a state of an SCell to be transited into the deactivated state, transit the state of the SCell corresponding to the value of the first indication bit string into the deactivated state.

It should be appreciated that, the UE 800 in the embodiments of the present disclosure is capable of implementing the above-mentioned SCell state indication method for the UE with a same beneficial effect, which will not be particularly defined herein.

Figure 15:
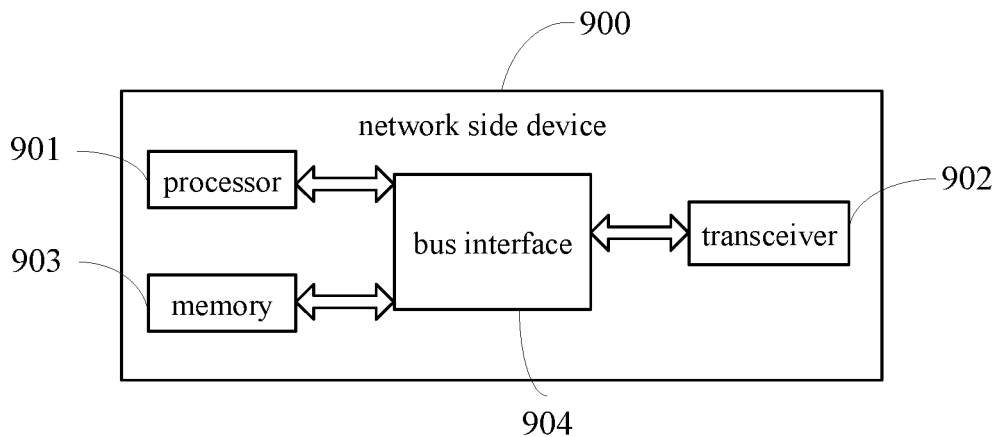
FIG. 15 is another schematic view showing the network side device according to an embodiment of the present disclosure.

The present disclosure further provides in some embodiments a network side device 900 which, as shown in FIG. 15, includes a processor 901, a transceiver 902, a memory 903 and a bus interface 904. The processor 901 is used to read a program stored in the memory 903, so as to configure state transition indication information, and the state transition indication information may be used to indicate an SCell state transition between two of an activated state, a deactivated state and a third state. The transceiver 902 is used to transmit the state transition indication information to a UE.

In FIG. 15, bus architecture may include a number of buses and bridges connected to each other, so as to connect various circuits for one or more processors such as the processor 901 and one or more memories such as the memory 903. In addition, as is known in the art, the bus architecture may be used to connect any other circuits, such as a circuit for a peripheral device, a circuit for a voltage stabilizer and a power management circuit, which are not particularly defined herein. The bus interface may be provided, and the transceiver 902 may consist of a plurality of elements, i.e., a transmitter and a receiver for communication with any other devices over a transmission medium. With respect to different UEs, a user interface 904 may also be provided for connecting devices which are to be arranged inside or outside the UE, and these devices may include but not limited to a keypad, a display, a speaker, a microphone and a joystick. The processor 901 may take charge of managing the bus architecture as well as general processings. The memory 903 may store therein data for the operation of the processor 901.

In a possible embodiment of the present disclosure, the state transition indication information may include an MAC CE of N bits, where N is a positive integer. The MAC CE may include M SCell sequence bits $C_i$, where M is a positive integer, and i is an integer smaller than or equal to M. A value of $C_i$ may be used to indicate the state transition of the SCell corresponding to $C_i$ between two of the activated state, the deactivated state and the third state.

In a possible embodiment of the present disclosure, the MAC CE may further include a reserved bit R. When a value of R is a first predetermined value, the state of the SCell corresponding to $C_i$ having a second predetermined value may be indicated to be transited into the third state; when the value of R is a third predetermined value, the state of the SCell corresponding to $C_i$ having a fourth predetermined value may be indicated to be transited from the third state into the activated state or the deactivated state; and when the value of R is a fifth predetermined value, the state of the SCell corresponding to $C_i$ having a sixth predetermined value may be indicated to be transited from a current state into a next state in a predetermined transition order.

In a possible embodiment of the present disclosure, the state transition indication information may include an MAC CE and a field L indicating a length of the MAC CE. The MAC CE may include at least two fields, and each field may include N bits, where N is a positive integer. Each field of the MAC CE may include M SCell sequence bits $C_i$, where M is a positive integer, and i is an integer smaller than or equal to M. A value of $C_i$ in each field may be used to indicate the state transition of the SCell corresponding to $C_i$ between two of the activated state, the deactivated state and the third state.

In a possible embodiment of the present disclosure, each field in the MAC CE may further include a reserved bit R. When a value of R in each field satisfies a first predetermined condition and the value of $C_i$ in each field satisfies a second predetermined condition, the state of the SCell corresponding to $C_i$ may be indicated to be transited into the third state; when the value of R in each field satisfies a third predetermined condition and the value of $C_i$ in each field satisfies a fourth predetermined condition, the state of the SCell corresponding to $C_i$ may be indicated to be transited from the third state into the activated state or the deactivated state; and when the value of R in each field satisfies a fifth predetermined condition and the value of $C_i$ in each field satisfies a sixth predetermined condition, the state of the SCell corresponding to $C_i$ may be indicated to be transited from a current state into a next state in the predetermined transition order.

In a possible embodiment of the present disclosure, the state transition indication information may include an LCID and a first MAC CE of N bits, where N is a positive integer. The first MAC CE may include M SCell sequence bits $C_i$, where M is a positive integer smaller than or equal to N, and i is an integer smaller than or equal to M. A value of LCID and a value of $C_i$ may be used to indicate the state transition of the SCell corresponding to $C_i$ between two of the activated state, the deactivated state and the third state.

In a possible embodiment of the present disclosure, when the value of LCID is a first predetermined value, the state of the SCell corresponding to $C_i$ having a second predetermined value may be indicated to be transited into the third state; when the value of LCID is a third predetermined value, the state of the SCell corresponding to $C_i$ having a fourth predetermined value may be indicated to leave the third state; and when the value of LCID is a fifth predetermined value, the state of the SCell corresponding to $C_i$ having a sixth predetermined value may be indicated to be transited from a current state into a next state in the predetermined transition order.

In a possible embodiment of the present disclosure, the state transition indication information may further include a second MAC CE, and the second MAC CE may be used to indicate the SCell state transition from the third state into the activated state or the deactivated state.

In a possible embodiment of the present disclosure, the state transition indication information may include an LCID and an MAC CE of N bits, where N is a positive integer. The MAC CE may include M SCell sequence bits $C_i$, where M is a positive integer smaller than or equal to N, and i is an integer smaller than or equal to M. A value of LCID and a value of $C_i$ may be used to indicate the state transition of the SCell corresponding to $C_i$ between two of the activated state, the deactivated state and the third state.

In a possible embodiment of the present disclosure, when the value of LCID is a first predetermined value, the state of the SCell corresponding to $C_i$ having a second predetermined value may be indicated to be transited from the third state into the activated state; when the value of LCID is a third predetermined value, the state of the SCell corresponding to $C_i$ having a fourth predetermined value may be indicated to be transited from the third state into the deactivated state; and when the value of LCID is a fifth predetermined value, the state of the SCell corresponding to $C_i$ having a sixth predetermined value may be indicated to be transited from the third state into a next state in the predetermined transition order.

In a possible embodiment of the present disclosure, the state transition indication information may include an LCID and an MAC CE of N bits, where N is a positive integer. The MAC CE may include M groups of SCell sequence bits $C_i$ and each group of $C_i$ may include X bits, where M is a positive integer, X is a positive integer greater than 1, and i is an integer smaller than or equal to M. A value of LCID and a value of the X bits in each group of $C_i$ may be used to indicate the state of the SCell corresponding to $C_i$ to be transited into any one of the activated state, the deactivated state and the third state.

In a possible embodiment of the present disclosure, the state transition indication information may include an MAC CE and a field L indicating a length of the MAC CE. The MAC CE may include a first indication bit string indicating a sequence of SCells and a second indication bit string indicating the state of the SCell, where M is a positive integer, and i is an integer smaller than or equal to M. The first indication bit string may include at least three bits, and the second indication bit string may include at least two bits. A value of the first indication bit string and a value of the second indication bit string may be used to indicate the state of the SCell corresponding to the first indication bit string to be transited into one of the activated state, the deactivated state and the third state.

It should be appreciated that, the network side device 900 in the embodiments of the present disclosure is capable of implementing the above-mentioned SCell state indication method for the network side device with a same beneficial effect, which will not be particularly defined herein.

Figure 16:
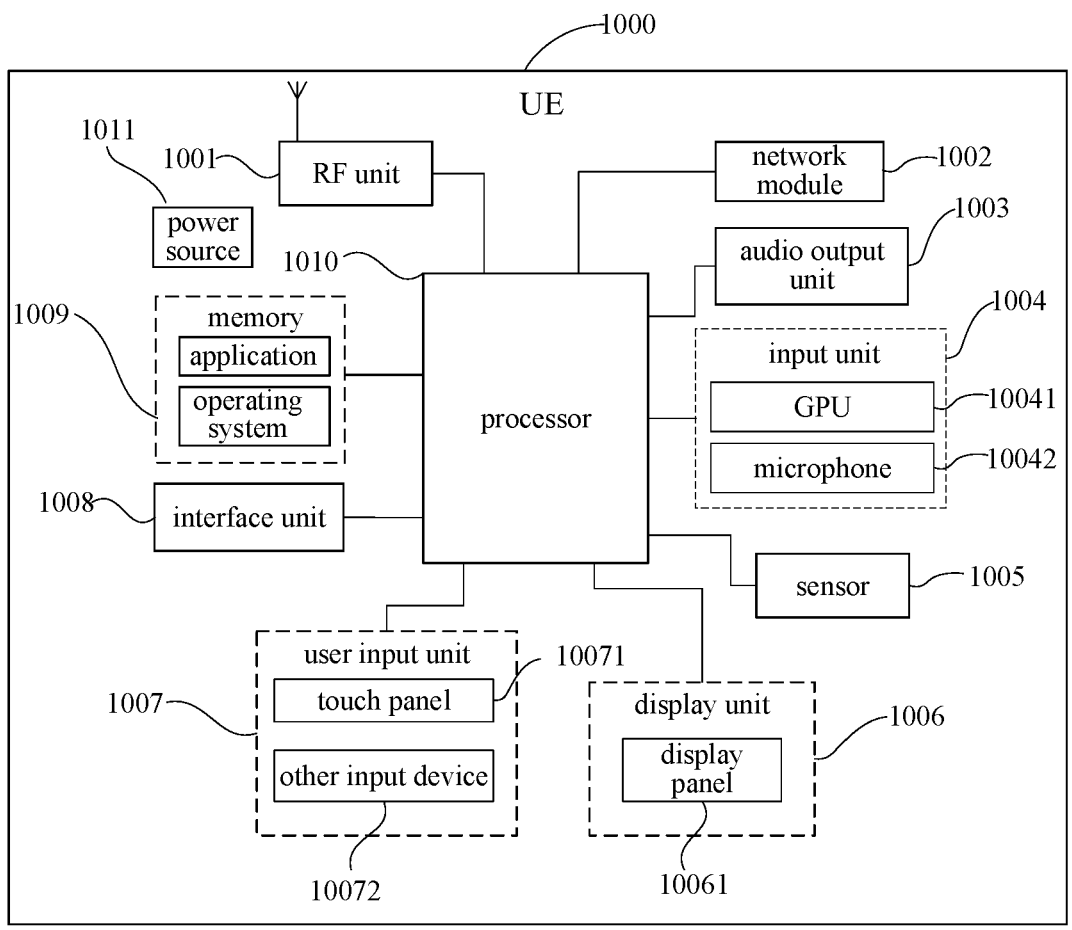
FIG. 16 is a schematic view showing a hardware structure of the UE according to an embodiment of the present disclosure.

The present disclosure further provides in some embodiments a UE 1000 which, as shown in FIG. 16, includes, but not limited to, an Radio Frequency (RF) unit 1001, a network module 1002, an audio output unit 1003, an input unit 1004, a sensor 1005, a, display unit 1006, a user input unit 1007, an interface unit 1008, a memory 1009, a processor 1010, and a power source 1011. It should be appreciated that, the structure in FIG. 10 shall not be construed as limiting the UE. The UE may include more or fewer members, or some members may be combined, or the UE may include some other members not shown in FIG. 10. In the embodiments of the present disclosure, the UE may include, but not limited to, mobile phone, flat-panel computer, notebook computer, palm computer, vehicle-mounted UE, wearable device or pedometer.

The RF unit 1001 is used to receive a state transition indication information from a network side device, and the state transition indication information may be used to indicate an SCell state transition between two of an activated state, a deactivated state and a third state. The processor 1010 is used to transit the state of SCell in accordance with the state transition indication information.

In a possible embodiment of the present disclosure, the state transition indication information may include an MAC CE of N bits, where N is a positive integer. The MAC CE may include M SCell sequence bits $C_i$, where M is a positive integer, and i is an integer smaller than or equal to M. A value of $C_i$ may be used to indicate the state transition of the SCell corresponding to $C_i$ between two of the activated state, the deactivated state and the third state.

In a possible embodiment of the present disclosure, the MAC CE may further include a reserved bit R. The processor 1010 is further used to: when a value of R is a first predetermined value, transit the state of the SCell corresponding to $C_i$ having a second predetermined value into the third state; when the value of R is a third predetermined value, transit the state of the SCell corresponding to $C_i$ having a fourth predetermined value from the third state into the activated state or the deactivated state; and when the value of R is a fifth predetermined value, transit the state of the SCell corresponding to $C_i$ having a sixth predetermined value from a current state into a next state in a predetermined transition order.

In a possible embodiment of the present disclosure, the state transition indication information may include an MAC CE and a field L indicating a length of the MAC CE. The MAC CE may include at least two fields, and each field may include N bits, where N is a positive integer. Each field of the MAC CE may include M SCell sequence bits $C_i$, where M is a positive integer, and i is an integer smaller than or equal to M. A value of $C_i$ in each field may be used to indicate the state transition of the SCell corresponding to $C_i$ between two of the activated state, the deactivated state and the third state.

In a possible embodiment of the present disclosure, each field in the MAC CE may further include a reserved bit R. When transiting the state of the SCell in accordance with the state transition indication information, the processor 1010 is further used to: when a value of R in each field satisfies a first predetermined condition and the value of $C_i$ in each field satisfies a second predetermined condition, transit the state of the SCell corresponding to $C_i$ into the third state; when the value of R in each field satisfies a third predetermined condition and the value of $C_i$ in each field satisfies a fourth predetermined condition, transit the state of the SCell corresponding to $C_i$ from the third state into the activated state or the deactivated state; and when the value of R in each field satisfies a fifth predetermined condition and the value of $C_i$ in each field satisfies a sixth predetermined condition, transit the state of the SCell corresponding to $C_i$ from a current state into a next state in the predetermined transition order.

In a possible embodiment of the present disclosure, the state transition indication information may include an LCID and a first MAC CE of N bits, where N is a positive integer. The first MAC CE may include M SCell sequence bits $C_i$, where M is a positive integer, and i is an integer smaller than or equal to M. A value of LCID and a value of $C_i$ may be used to indicate the state transition of the SCell corresponding to $C_i$ between two of the activated state, the deactivated state and the third state.

In a possible embodiment of the present disclosure, when transiting the state of the SCell in accordance with the state transition indication information, the processor 1010 is further used to: when the value of LCID is a first predetermined value, transit the state of the SCell corresponding to $C_i$ having a second predetermined value into the third state; when the value of LCID is a third predetermined value, enable the state of the SCell corresponding to $C_i$ having a fourth predetermined value to leave the third state; and when the value of LCID is a fifth predetermined value, transit the state of the SCell corresponding to $C_i$ having a sixth predetermined value from a current state into a next state in the predetermined transition order.

In a possible embodiment of the present disclosure, the state transition indication information may further include a second MAC CE, and the second MAC CE may be used to indicate the SCell state transition from the third state into the activated state or the deactivated state.

In a possible embodiment of the present disclosure, the state transition indication information may include an LCID and an MAC CE of N bits, where N is a positive integer. The MAC CE may include M SCell sequence bits $C_i$, where M is a positive integer smaller than or equal to N, and i is an integer smaller than or equal to M. A value of LCID and a value of $C_i$ may be used to indicate the state transition of the SCell corresponding to $C_i$ between two of the activated state, the deactivated state and the third state.

In a possible embodiment of the present disclosure, when transiting the state of the SCell in accordance with the state transition indication information, the processor 1010 is further used to: when the value of LCID is a first predetermined value, transit the state of the SCell corresponding to $C_i$ having a second predetermined value from the third state into the activated state; when the value of LCID is a third predetermined value, transit the state of the SCell corresponding to $C_i$ having a fourth predetermined value from the third state into the deactivated state; and when the value of LCID is a fifth predetermined value, transit the state of the SCell corresponding to $C_i$ having a sixth predetermined value from the third state into a next state in the predetermined transition order.

In a possible embodiment of the present disclosure, the state transition indication information may include an LCID and an MAC CE of N bits, where N is a positive integer. The MAC CE may include M groups of SCell sequence bits $C_i$, and each group of $C_i$ may include X bits, where M is a positive integer, X is a positive integer greater than 1, and i is an integer smaller than or equal to M. A value of LCID and a value of the X bits in each group of $C_i$ may be used to indicate the state of the SCell corresponding to $C_i$ to be transited into one of the activated state, the deactivated state and the third state.

In a possible embodiment of the present disclosure, when transiting the state of the SCell in accordance with the state transition indication information, the processor 1010 is further used to: when the value of the X bits in $C_i$ is used to indicate the state of the SCell corresponding to $C_i$ to be transited into the third state, transit the state of the SCell corresponding to $C_i$ into the third state; when the value of the X bits in $C_i$ is used to indicate the state of the SCell corresponding to $C_i$ to be transited into the activated state, transit the state of the SCell corresponding to $C_i$ into the activated state; and when the value of the X bits in $C_i$ is used to indicate the state of the SCell corresponding to $C_i$ to be transited into the deactivated state, transit the state of the SCell corresponding to $C_i$ into the deactivated state.

In a possible embodiment of the present disclosure, the state transition indication information may include an MAC CE and a field L indicating a length of the MAC CE. The MAC CE may include a first indication bit string indicating a sequence of SCells and a second indication bit string indicating the state of the SCell, where M is a positive integer, and i is an integer smaller than or equal to M. The first indication bit string may include at least three bits, and the second indication bit string may include at least two bits. A value of the first indication bit string and a value of the second indication bit string may be used to indicate the state of the SCell corresponding to the first indication bit string to be transited into one of the activated state, the deactivated state and the third state.

In a possible embodiment of the present disclosure, when transiting the state of the SCell in accordance with the state transition indication information, the processor 1010 is further used to: when the value of the second indication bit string is used to indicate a state of an SCell to be transited into the third state, transit the state of the SCell corresponding to the value of the first indication bit string into the third state; when the value of the second indication bit string is used to indicate a state of an SCell to be transited into the activated state, transit the state of the SCell corresponding to the value of the first indication bit string into the activated state; and when the value of the second indication bit string is used to indicate a state of an SCell to be transited into the deactivated state, transit the state of the SCell corresponding to the value of the first indication bit string into the deactivated state.

According to the embodiments of the present disclosure, the state transition indication information may be configured and used to indicate the SCell state transition between two of the activated state, the deactivated state and the third state. As a result, after the introduction of the third state, it is able to reduce a delay generated when the SCell is transited between the activated state and the deactivated state, and improve the capability of the communication system.

It should be appreciated that, in the embodiments of the present disclosure, the RF unit 1001 is used to transmit and receive signals during the information transmission or phone call. To be specific, the RF unit 1001 may, upon the receipt of downlink data from the network device, transmit the downlink data to the processor 1010 for subsequent treatment. In addition, the RF unit 1001 may transmit uplink data to the network device. Usually, the RF unit 1001 may include, but not limited to, an antenna, at least one amplifier, a transceiver, a coupler, a low-noise amplifier and a duplexer. In addition, the RF unit 1001 may communicate with a network and the other devices via a wireless communication system.

The network module 1002 of the UE is used to enable the UE to access the broadband Internet in a wireless manner, e.g., help a user to receive and send an e-mail, browse a web page or access a streaming media.

The audio output unit 1003 is used to transit audio data received by the RF unit 1001 or the network module 1002, or audio data stored in the memory 1009, into an audio signal and output the audio signal as a sound. In addition, the audio output unit 1003 is further used to provide an audio output related to a specific function executed by the UE 1000 (e.g., a sound occurring when a calling signal or a message has been received). The audio output unit 1003 may include, e.g., a loudspeaker, a buzzer and a receiver.

The input unit 1004 is used to receive an audio or video signal. It may include a Graphics Processing Unit (GPU) 10041 and a microphone 10042. The GPU 10041 is used to process image data of a static image or video acquired by an image collection unit (e.g., a camera) in a video capturing mode or an image capturing mode, and a processed image frame may be displayed by the display unit 106. The image frame processed by the GPU 10041 may be stored in the memory 1009 (or another storage medium) or transmitted via the RF unit 1001 or network module 1002. The microphone 1042 is used to receive a sound, and transit the sound into voice data. In a call mode, the processed audio data may be transited into data in a format capable of being transmitted by the RF unit 1001 to a mobile communication base station.

The at least one sensor 1005 included in the UE 1000 may include a light sensor, a movement sensor and the other sensors. To be specific, the light sensor may include an ambient light sensor or a proximity sensor. The ambient light sensor is used to adjust a brightness value of a display panel 10061 in accordance with ambient light. The proximity sensor is used to turn off the display panel 10061 and/or a backlight source when the UE 1000 moves close to an ear. As one of the movement sensors, an accelerometer may detect acceleration in various directions (usually a three-axis accelerometer), and detect a level and a direction of a gravity force in a static state. Through the accelerometer, it is able to identify a posture of the UE (e.g., perform a switching operation between portrait and landscape orientations, play relevant games, and calibrate a posture of a magnetometer), and perform vibration-related functions (e.g., count steps and strikes). The sensor 1005 may further include a fingerprint sensor, a pressure sensor, an iris sensor, a molecule sensor, a gyroscope, a barometer, a hygrometer, a thermometer or an infrared sensor, which will not be particularly defined herein.

The display unit 1006 is used to display information inputted by the user or provided to the user. The display unit 1006 may include the display panel 10061, e.g., a Liquid Crystal Display (LCD) panel, or an Organic Light-Emitting Diode (OLED) panel.

The user input unit 1007 is used to receive digital or character information inputted by the user, and generate a key signal input related to user settings and function control of the UE. To be specific, the user input unit 1007 may include a touch panel 10071 and another input device 10072. The touch panel 10071, also called as touch screen, is used to collect a touch operation made by the user on or in proximity to the touch panel (e.g., an operation made by the user through any appropriate object or attachment (e.g., finger or stylus) on or in the proximity to the touch panel 10071). The touch panel 10071 may include a touch detection device and a touch controller. The touch detection device is used to detect a touch position and a signal generated due to the touch operation, and transmit the signal to the touch controller. The touch controller is used to receive touch information from the touch detection device, transit it into coordinates of a touch point, transmit the coordinates to the processor 1010, and receive and execute a command from the processor 1010. In addition, the touch panel 10071 may be of a resistive type, a capacitive type, an infrared type or a surface acoustic wave (SAW) type. In addition to the touch panel 10071, the user input unit 1007 may further other input device 10072 including, but not limited to, a physical keyboard, a functional button (e.g., a volume control button or an on/off button), a trackball, a mouse, and a joystick, which will not be particularly defined herein.

Further, the touch panel 10071 may cover the display panel 10061. When the touch operation made on or in proximity to the touch panel 10071 has been detected by the touch panel 10071, the touch panel 10071 may transmit the touch information to the processor 1010, so as to determine a type of a touch event. Then, the processor 1010 may control the display panel 10061 to provide a corresponding visual output in accordance with the type of the touch event. Although the touch panel 10071 and the display panel 10061 are configured as two separate members to achieve the input and the output functions of the UE in FIG. 16, in some embodiments of the present disclosure, they may be integrated so as to achieve the input and output functions of the electronic device, which will not be particularly defined herein.

The interface unit 1008 is used to provide an interface between an external device and the UE 1000. For example, the external device may include a wired or wireless headset port, an external power source port (or a battery charger port), a wired or wireless data port, a memory card port, a port for connecting a device having an identification module, an audio Input/Output (I/O) port, a video I/O port, and an earphone port. The interface unit 1008 is used to receive an input from the external device (e.g., data information and electricity) and transmit the received input to one or more elements of the UE 1000, or transmit data between the UE 1000 and the external device.

The memory 1009 is used to store therein a software application and various data. It may mainly include an application storage area and a data storage area. An operating system and at least one application for the functions (e.g., an audio/image playing function) may be stored in the application storage area. Data created in accordance with the operation of the mobile phone (e.g., audio data and textbook) may be stored in the data storage area. In addition, the memory 1009 may include a high-speed Random Access Memory (RAM), or a non-volatile memory (e.g., at least one magnetic disk or flash memory), or any other volatile solid state memory.

As a control center of the electronic device, the processor 1010 may be connected to the various members of the UE via various interfaces and circuits, and used to run or execute the software program and/or module stored in the memory 1009, and call the data stored in the memory 1009, so as to execute the functions of the UE and process the data, thereby to monitor the entire UE. The processor 1010 may include one or more processing units. In a possible embodiment of the present disclosure, an application processor and a modem may be integrated into the processor 1010. The application processor is mainly used to process the operating system, a user interface, the application, and the like. The modem is mainly used to process wireless communication. It should be appreciated that, the modem may also not be integrated into the processor 1010.

The power source 1011 (e.g., a battery) is used to supply power to the members of the UE 1000. In a possible embodiment of the present disclosure, the power source 1011 is logically connected to the processor 1010 via a power source management system, so as to achieve such functions as charging, discharging and power consumption management through the power source management system.

In addition, the UE 1000 may include some functional modules not shown in FIG. 16, which will not be particularly defined herein.

The present disclosure further provides in some embodiments a UE, which includes a processor 1010, a memory 1009, and a computer program stored in the memory 1009 and executed by the processor 1010. The processor 1010 is used to execute the computer program so as to implement the above-mentioned SCell state indication method with a same technical effect, which will not be particularly defined herein.

The present disclosure further provides in some embodiments a computer-readable storage medium storing therein a computer program. The computer program is executed by a processor, so as to implement the above-mentioned SCell state indication method with a same technical effect, which will not be particularly defined herein. The computer-readable storage medium may be, e.g., a Read-Only Memory (ROM), a Random Access Memory (RAM), a magnetic disk or an optical disk.

It should be appreciated that, such words as "include" or "including" or any other variations involved in the present disclosure intend to provide non-exclusive coverage, so that a procedure, method, article or device including a series of elements may also include other elements not listed herein, or may include inherent elements of the procedure, method, article or device. If without any further limitations, for the elements defined by such sentence as "including one . . . ", it is not excluded that the procedure, method, article or device including the elements may also include other identical elements.

Through the above-mentioned description, it may be apparent for a person skilled in the art that the methods of the embodiments may be implemented by software as well as a necessary common hardware platform, or by hardware, and the former may be better in most cases. Based on this, the technical solutions of the present disclosure, essentially, or parts of the technical solutions of the present disclosure contributing to the related art, may appear in the form of software products, which may be stored in a storage medium (e.g., ROM/RAM, magnetic disk or optical disk) and include several instructions so as to enable a terminal device (e.g., mobile phone, computer, server, air conditioner or network device) to execute the method in the embodiments of the present disclosure.

The above embodiments are for illustrative purposes only, but the present disclosure is not limited thereto. A person skilled in the art may make further modifications and improvements without departing from the principle of the present disclosure, and these modifications and improvements shall also fall within the scope of the present disclosure. Therefore, a protection scope of the present disclosure shall be defined by claims.

What is claimed is:

1. A Secondary Cell (SCell) state indication method for a network side device, comprising:
configuring state transition indication information, the state transition indication information being used to indicate an SCell state transition between two of an activated state, a deactivated state and a third state; and
transmitting the state transition indication information to a User Equipment (UE),
wherein the state transition indication information comprises an LCID and an MAC CE of N bits, where N is a positive integer;
the MAC CE comprises M SCell sequence bits $C_i$, where M is a positive integer smaller than or equal to N, and i is an integer smaller than or equal to M, wherein the MAC CE is of a format of 8 carriers and 1 byte, or the MAC CE is of 32 carriers and 4 bytes;
a value of the LCID and a value of $C_i$ are used to indicate the state transition of the SCell corresponding to $C_i$ between two of the activated state, the deactivated state and the third state.

2. The SCell state indication method according to claim 1, wherein
when the value of the LCID is a first predetermined value, the state of the SCell corresponding to $C_i$ having a second predetermined value is indicated to be transited from the third state into the activated state;
when the value of the LCID is a third predetermined value, the state of the SCell corresponding to $C_i$ having a fourth predetermined value is indicated to be transited from the third state into the deactivated state.

3. The SCell state indication method according to claim 1, wherein
when the value of the LCID is a fifth predetermined value, the state of the SCell corresponding to $C_i$ having a sixth predetermined value is indicated to be transited from the third state into a next state in a predetermined transition order.

4. A non-transitory computer-readable storage medium storing therein a computer program, wherein the computer program is capable of being executed by a processor, to implement the SCell state indication method according to claim 1.

5. The non-transitory computer-readable storage medium according to claim 4, wherein
when the value of the LCID is a first predetermined value, the state of the SCell corresponding to $C_i$ having a second predetermined value is indicated to be transited from the third state into the activated state;
when the value of the LCID is a third predetermined value, the state of the SCell corresponding to $C_i$ having a fourth predetermined value is indicated to be transited from the third state into the deactivated state.

6. The non-transitory computer-readable storage medium according to claim 4, wherein
when the value of the LCID is a fifth predetermined value, the state of the SCell corresponding to $C_i$ having a sixth predetermined value is indicated to be transited from the third state into a next state in a predetermined transition order.

7. A Secondary Cell (SCell) state indication method for a User Equipment (UE), comprising:
receiving a state transition indication information transmitted by a network side device, the state transition indication information being used to indicate an SCell state transition between two of an activated state, a deactivated state and a third state; and
transiting the state of the SCell in accordance with the state transition indication information,
wherein the state transition indication information comprises an LCID and an MAC CE of N bits, where N is a positive integer;
the MAC CE comprises M SCell sequence bits $C_i$, where M is a positive integer smaller than or equal to N, and i is an integer smaller than or equal to M, wherein the MAC CE is of a format of 8 carriers and 1 byte, or the MAC CE is of 32 carriers and 4 bytes;
a value of the LCID and a value of $C_i$ are used to indicate the state transition of the SCell corresponding to $C_i$ between two of the activated state, the deactivated state and the third state.

8. The SCell state indication method according to claim 7, wherein the transiting the state of the SCell in accordance with the state transition indication information comprises:
when the value of the LCID is a first predetermined value, transiting the state of the SCell corresponding to $C_i$ having a second predetermined value from the third state into the activated state;
when the value of the LCID is a third predetermined value, transiting the state of the SCell corresponding to $C_i$ having a fourth predetermined value from the third state into the deactivated state.

9. The SCell state indication method according to claim 7, wherein the transiting the state of the SCell in accordance with the state transition indication information comprises:
when the value of the LCID is a fifth predetermined value, transiting the state of the SCell corresponding to $C_i$ having a sixth predetermined value from the third state into a next state in a predetermined transition order.

10. The SCell state indication method according to claim 8, wherein the transiting the state of the SCell in accordance with the state transition indication information comprises:
when the value of the LCID is a fifth predetermined value, transiting the state of the SCell corresponding to $C_i$ having a sixth predetermined value from the third state into a next state in a predetermined transition order.

11. A User Equipment (UE), comprising a memory, a processor, and a computer program stored in the memory and capable of being executed by the processor, wherein the processor is used to execute the computer program, to implement the SCell state indication method according to claim 7.

12. The UE according to claim 11, wherein the transiting the state of the SCell in accordance with the state transition indication information comprises:
when the value of the LCID is a first predetermined value, transiting the state of the SCell corresponding to $C_i$ having a second predetermined value from the third state into the activated state;
when the value of the LCID is a third predetermined value, transiting the state of the SCell corresponding to $C_i$ having a fourth predetermined value from the third state into the deactivated state.

13. The UE according to claim 11, wherein the transiting the state of the SCell in accordance with the state transition indication information comprises:
when the value of the LCID is a fifth predetermined value, transiting the state of the SCell corresponding to $C_i$ having a sixth predetermined value from the third state into a next state in a predetermined transition order.

14. The UE according to claim 12, wherein the transiting the state of the SCell in accordance with the state transition indication information comprises:
when the value of the LCID is a fifth predetermined value, transiting the state of the SCell corresponding to $C_i$ having a sixth predetermined value from the third state into a next state in a predetermined transition order.

15. A non-transitory computer-readable storage medium storing therein a computer program, wherein the computer program is capable of being executed by a processor, to implement the SCell state indication method according to claim 7.

16. The non-transitory computer-readable storage medium according to claim 15, wherein the transiting the state of the SCell in accordance with the state transition indication information comprises:
when the value of the LCID is a first predetermined value, transiting the state of the SCell corresponding to $C_i$ having a second predetermined value from the third state into the activated state;
when the value of the LCID is a third predetermined value, transiting the state of the SCell corresponding to $C_i$ having a fourth predetermined value from the third state into the deactivated state.

17. The computer-readable storage medium according to claim 15, wherein the transiting the state of the SCell in accordance with the state transition indication information comprises:

when the value of the LCID is a fifth predetermined value, transiting the state of the SCell corresponding to $C_i$ having a sixth predetermined value from the third state into a next state in a predetermined transition order.

18. A network side device, comprising a memory, a processor, and a computer program stored in the memory and capable of being executed by the processor, wherein the processor is used to execute the computer program to:

configure state transition indication information, wherein the state transition indication information is used to indicate an SCell state transition between two of an activated state, a deactivated state and a third state; and transmit the state transition indication information to a User Equipment (UE), wherein the state transition indication information comprises an LCID and an MAC CE of N bits, where N is a positive integer;

the MAC CE comprises M SCell sequence bits $C_i$, where M is a positive integer smaller than or equal to N, and i is an integer smaller than or equal to M, wherein the MAC CE is of a format of 8 carriers and 1 byte, or the MAC CE is of 32 carriers and 4 bytes;

a value of the LCID and a value of $C_i$ are used to indicate the state transition of the SCell corresponding to $C_i$ between two of the activated state, the deactivated state and the third state.

19. The network side device according to claim 18, wherein when the value of the LCID is a first predetermined value, the state of the SCell corresponding to $C_i$ having a second predetermined value is indicated to be transited from the third state into the activated state;

when the value of the LCID is a third predetermined value, the state of the SCell corresponding to $C_i$ having a fourth predetermined value is indicated to be transited from the third state into the deactivated state.

20. The network side device according to claim 18, wherein when the value of the LCID is a fifth predetermined value, the state of the SCell corresponding to $C_i$ having a sixth predetermined value is indicated to be transited from the third state into a next state in a predetermined transition order.

* * * * *